Feb. 26, 1963 M. CAMRAS 3,079,470

MAGNETIC TRANSDUCER HEAD

Filed Dec. 21, 1959 2 Sheets-Sheet 1

Inventor
Marvin Camras

By Hill, Sherman, Meroni, Gross & Simpson
Attys.

Feb. 26, 1963 M. CAMRAS 3,079,470

MAGNETIC TRANSDUCER HEAD

Filed Dec. 21, 1959 2 Sheets-Sheet 2

Inventor
Marvin Camras by Hill, Sherman, Meroni, Gross & Simpson Attys.

United States Patent Office 3,079,470
Patented Feb. 26, 1963

3,079,470

MAGNETIC TRANSDUCER HEAD

Marvin Camras, Glencoe, Ill., assignor to Armour Research Foundation of Illinois Institute of Technology, Chicago, Ill., a corporation of Illinois Filed Dec. 21, 1959, Ser. No. 860,875
12 Claims. (Cl. 179—100.2)

This invention relates to a method and means for making a magnetic head, and particularly to a method and means of making a head of high resistivity material such as ferrite.

It is an object of the invention to provide a method of making a magnetic head having an extremely fine gap, superior high frequency performance and superior wear resistance.

Another object of the invention is to provide a magnetic head having a gap structure of high resistivity material providing a greatly improved gap dimension stability and precision.

A further object of the invention is to provide a novel magnetic head construction and method of making the same.

Still another object of the invention is to provide a novel method for making a magnetic head particularly adapted for use with ferrite or other high resistivity materials.

A still further object of the invention is to provide a novel magnetic head construction having a very precise stable gap structure capable of maintaining precise gap dimensions in spite of wear from the record medium thereon and the like.

Another and further object of the invention resides in the provision of an economical method for producing heads in quantity yet with a very high degree of precision.

Yet another object of the invention resides in the provision of a method of making a magnetic head which accommodates a more precise and less critical assembly procedure than is possible where individual poles of a magnetic head are individually formed.

An important advantage of the present invention resides in the fact that the gap faces are formed to optical flatness while part of a substantially more extended surface area. Very precise optical methods of polishing are available for such extended surfaces which could not be applied to individual gap defining faces of individual poles. The gap material is more readily applied to the more extended surfaces provided by the method of the present invention, and a much more precise gap is formed.

It is a further object of the present invention to provide a method of making a magnetic head wherein the gap is disposed in a very precise straight line.

It is a still further object of the present invention to provide a method for making a magnetic head wherein the gap space is very small and accurate.

Other objects, features and advantages of the present invention will be apparent from the following detailed description taken in connection with the accompanying drawings, in which.

As shown in the drawings.

The embodiment of FIGURES 1 to 9 of the present invention is particularly adapted for the forming of magnetic head assemblies from ferrite or high resistivity material, but can also be used for laminated structures and for applications where thick sections of magnetic material do not have excessive eddy current loss.

Figure 1:
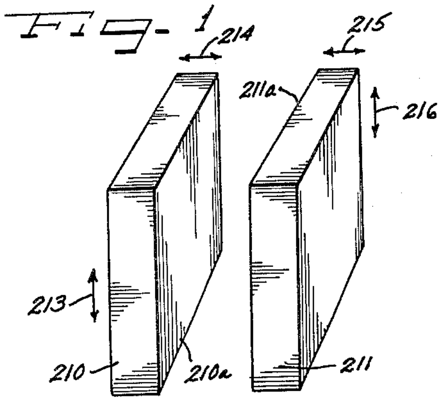
FIGURE 1 is a perspective view of a different embodiment of the invention and illustrating a pair of blocks of magnetic material having confronting surfaces polished to optical flatness.

In accordance with the illustrated embodiment, a pair of ferrite blocks 210 and 211 have surfaces 210*a* and 211*a* thereof polished to optical flatness. By way of example, each block may be one-half inch square by one-quarter inch high (in the direction of arrow 216). For quantity production a much larger area is practical. Single crystal ferrite is ideal to avoid the irregularities and granular structure of sintered ferrite, and preferably as indicated in FIGURE 1 the directions of easy magnetization of the single crystal ferrite blocks are those indicated by the arrows 213, 214, 215 and 216. This orientation is preferred since it is in conformity with the direction of flux paths in the gap subassemblies to be formed from the blocks. With single crystal ferrite material it has been found that much finer gaps can be produced and maintained than are possible with sintered ferrites used in the prior art. However, the same construction is also applicable for less critical work, where fine grain ferrites may be used.

Homogeneous ferrite material which is not single crystal, or which is of imperfect crystal structure but has the required magnetic qualities (noted below) may be substituted for single crystal material. A preferred gap size is below 5 microns (one micron equals one millionth of a meter), and with care, assemblies with gaps of 0.25 microns or less may be formed.

Figure 2:
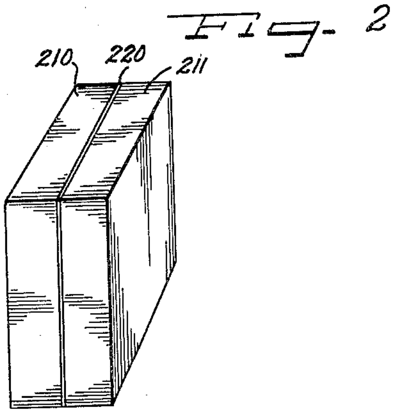
FIGURE 2 illustrates the confronting surfaces secured together at their flat surfaces.

In assembling the blocks as illustrated in FIGURE 2, a gap spacer 220 may be provided by depositing an evaporated film, for example gold in ¼ micron thickness, on one or both of the polished surfaces 210*a* and 211*a*. Alternatively a layer of foil of proper thickness may be used as a gap spacer, and for even finer gaps the spacer may be omitted entirely.

The mating surfaces 210*a* and 211*a* are then coated with epoxy resin of thin consistency and clamped together until the resin has hardened. Alternatively a low melting point "glass" may be used as an adhesive for the mating surfaces. Metals such as indium which wet and adhere to ferrite may also be used. For the very smallest gaps, cement need not be used on the gap faces.

Figure 3:
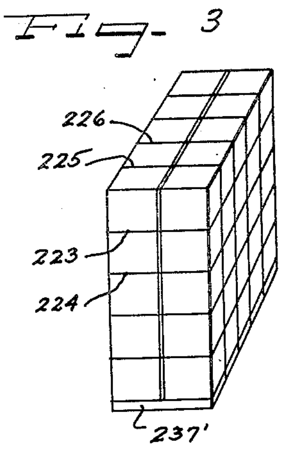
FIGURE 3 is a diagrammatic perspective view illustrating the manner in which the assembly of FIGURE 2 is subdivided to provide a plurality of gap subassemblies.
Figure 4:
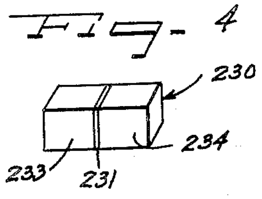
FIGURE 4 is a diagrammatic perspective view of one of the gap subassemblies subdivided as indicated in FIGURE 3.
Figure 5:
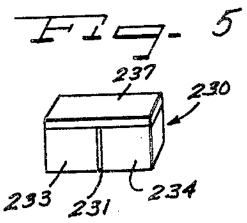
FIGURES 5, 6 and 7 illustrate steps in the finishing of the gap subassembly of FIGURE 4 into a magnetic transducer head pole assembly.

FIGURE 2 illustrates the manner in which the block of FIGURE 2 may be cut along horizontal and vertical planes such as indicated at 223, 224, 225 and 226 to form gap units such as indicated at 230 in FIGURE 4 having gap sections 231 separating ferrite portions such indicated at 233 and 234. In cases where cementing at the gap is not used reinforcing is applied to at least one side of each gap unit, for example as shown at 237′ in FIGURE 3, before the cuts are made.

Figure 6:
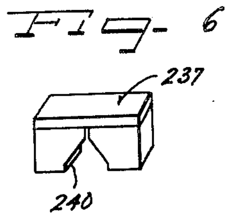

After the step of FIGURES 3 and 4, a reinforcing piece 237 is fastened to one side of the unit 230 so as to allow the removal of material from the other side to reduce the gap facing area as indicated at 240 in FIGURE 6.

Figure 7:
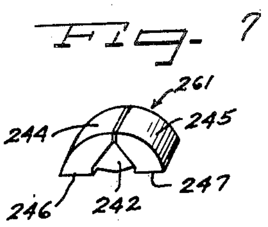

As shown in FIGURE 7, non-magnetic reinforcing material as indicated at 242 is fastened in the notch 240 illustrated in FIGURE 6, while tape receiving surfaces 244 and 245 are shaped, and surfaces such as indicated at 246 and 247 are made flat and coplanar.

Figure 8:
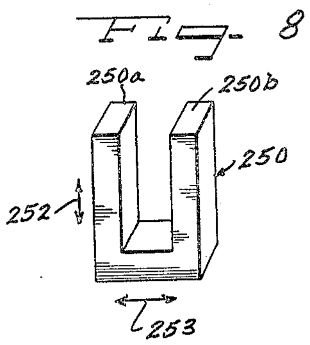
FIGURE 8 illustrates a yoke for receiving the gap assembly of FIGURE 7.

As indicated in FIGURE 8, a yoke 250 is formed of ferrite material, with surfaces 250*a* and 250*b* polished flat and in the same plane to receive surfaces 246 and 247 of the gap unit shown in FIGURE 7. By way of example, the yoke 250 may be formed of single crystal ferrite with the directions of easy magnetization as indicated by the arrows 252 and 253 to conform with the flux path in the yoke. However it is preferable to make the yoke of sintered ferrite, which may be "molded" into the correct shape, and which is formed of a composition having superior magnetic properties including high initial permeability, high saturation flux density, and a high enough Curie point to insure stability at normal operating temperatures.

Figure 9:
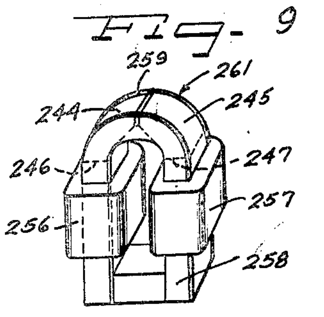
FIGURE 9 illustrates the final assembly of the subunits of FIGURES 7 and 8.

FIGURE 9 illustrates the final assembly with coils 256 and 257 and non-magnetic side plates 258 and 259 applied to the assembly of yoke 250 and gap subassembly 261 of FIGURE 7. The side plates facilitate mounting of the assembly and serve to strengthen and reinforce the gap unit in its mounting with the yoke 250. In many cases, the side plates 258 and 259 may be omitted and surfaces 246 and 247 and 250*a* and 250*b* glued in place.

Figure 10:
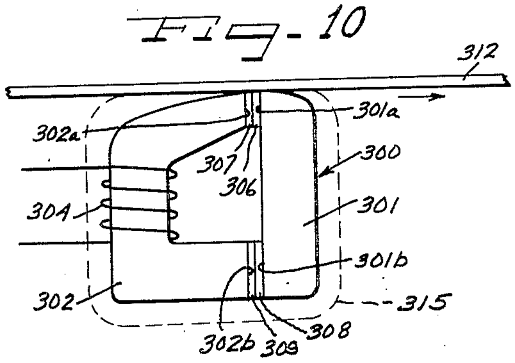
FIGURES 10, 11 and 12 show further embodiments utilizing ferrite cores and vacuum deposited gap spacers.

FIGURE 10 illustrates a further ferrite head configuration indicated generally by the reference numeral 300. The head 300 may comprise two core parts 301 and 302 of a suitable ferrite material such as "Ferroxcube," this material comprising a manganese-zinc-ferrite composition. The part 301 may comprise a relatively straight bar of rectangular cross-section having edge portions defining planar gap faces 301*a* and 101*b*. The other part 302 is of a generally C-shape and has planar gap defining edge faces 302*a* and 302*b* confronting the faces 301*a* and 301*b*. The core part 302 may have a winding 304 wound thereon prior to assembly of the core part 302 with the core part 301. The edge gap defining face 301*a*, 301*b* and 302*a* and 302*b* may have a suitable non-magnetic gap material vacuum deposited thereon to a thickness of one micron, for example. Examples of suitable gap materials are aluminum, gold, chromium, titanium and silicon. The reference numerals 306, 307, 308 and 309 indicate diagrammatically gap material vacuum deposited on the respective gap faces 301*a*, 302*a*, 301*b*, 302*b*, and having a total thickness between the confronting gap faces which is preferably below 5 microns. When the core parts 301 and 302 are assembled with their respective gap layers in contact, the gay layers 306, 307 and 308, 309 completely fill the gaps in the magnetic circuit defined by the core parts 301 and 302. The head 300 may cooperate with a magnetizable record medium 312 which travels successively across the top edges of the core parts 301 and 302 in coupling relation to the non-magnetic gap defined by the gap layers 306 and 307. The assembly of FIGURE 10 may be secured in assembled relation by any suitable means, for example by potting the assembly in epoxy resin as indicated diagrammatically by the dash line 315.

Figure 11:
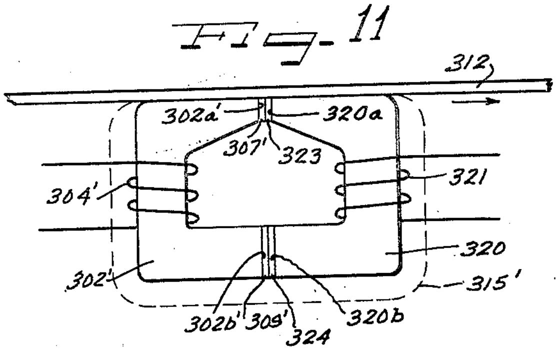

FIGURE 11 shows an embodiment which is entirely similar to the embodiment of FIGURE 10, except that a second C-shaped ferrite core part 320 is substituted for the core part 301 in FIGURE 10 and carries a second coil 321. Corresponding primed reference numerals are given to similar parts. The end faces 320*a* and 320*b* are provided with vacuum deposited layers as indicated diagrammatically at 323 and 324 which together with the layers 307′ and 309′ of non-magnetic material completely fill the gaps in the magnetic circuit defined by the core parts 302′ and 320. The total gap length of each gap in the magnetic circuit is preferably less than 5 microns and may, for example, be 2 microns. The gap spacer may be of any of the materials mentioned in connection with FIGURE 10.

Figure 12:
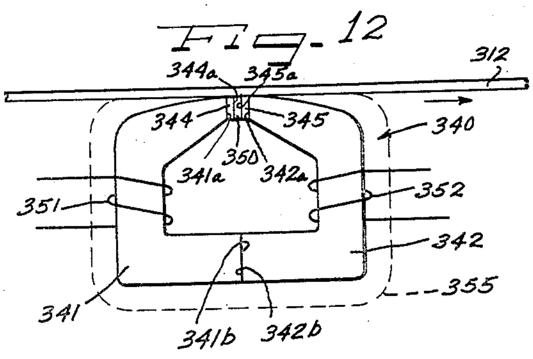

FIGURE 12 illustrates a magnetic transducer head 340 comprising a pair of C-shaped core parts of ferrite material defining a ring-type head. In this embodiment, the end faces 341*a* and 342*a* are relatively spaced, while faces 341*b* and 342*b* may be in direct contact. In FIGURE 12, the upper gap is formed by thin pieces of metal magnetic material such as Mumetal pieces 344 and 345, so that the gap remains sharp even though the adjacent ferrite material of core parts 341 and 342 is somewhat irregular. The gap between the Mumetal parts 344 and 345 may be provided by vacuum depositing a suitable non-magnetic material such as discussed above on one or both of the confronting surfaces 344*a* and 345*a* of the pole piece members 344 and 345. In FIGURE 12, the gap material 350 may be deposited on face 344*a* to completely fill the gap in the magnetic circuit including core parts 341 and 342 and pole piece members 344 and 345. The assembly of FIGURE 12 including windings 351 and 352 may be embedded in an epoxy resin casing as indicated by the dash line 355. It is found that the sandwich including pole piece parts 344 and 345 and gap material 350 should be kept very thin in the direction between faces 341*a* and 342*a* to avoid interference effects that produce a notch in the response curve at an audible frequency.

In each of the illustrated embodiments, the gap in the magnetic circuit is preferably less than 5 microns and is provided by metal deposited on one or more of the gap defining faces of the confronting magnetic parts. Vacuum deposition of the gap material is preferred for accuracy, although plating can be used. Copper is a desirable material for gap spacers because of its high conductivity and because a copper gap is readily observable under a microscope in contrast to the core pieces.

Facilities for evaporating metal are common in the optical industry for coating lenses and mirrors. Evaporated metal on plastic is also widely used for decorative emblems.

The present application is a continuation-in-part of Serial No. 723,304 filed March 24, 1958.

It will be apparent that many modifications and variations may be effected without departing from the scope of the novel concepts of the present invention.

I claim as my invention:

1. A magnetic head comprising a pair of single crystal ferrite blocks having flat planar surfaces thereof in confronting relation to form a non-magnetic gap, said blocks having a direction of easy magnetization perpendicular to the plane of said confronting surfaces.

2. A magnetic head comprising a pair of homogeneous non-sintered ferrite members having respective surfaces in confronting relation to define a non-magnetic gap between said members.

3. A magnetic head comprising a pair of magnetic members of homogeneous ferrite material having respective surfaces in confronting relation to define a non-magnetic gap less than about 5 microns in length in the direction spanning said blocks.

4. A magnetic head comprising a pair of single crystal ferrite members having respective surfaces in confronting relation to define a non-magnetic gap.

5. A magnetic head comprising a pair of single crystal ferrite members having flat planar surfaces in confronting relation to form a non-magnetic gap for coupling to a magnetic record medium, and a yoke structure of sintered ferrite material forming a loop magnetic circuit with said single crystal ferrite members and the non-magnetic gap therebetween.

6. A magnetic head comprising a pair of single crystal ferrite members having flat planar surfaces in confronting relation and having an evaporated film of non-magnetic material deposited on at least one of said surfaces and rigidly determining the spacing between said surfaces to define a non-magnetic gap for coupling to a magnetic record medium.

7. A magnetic head comprising a pair of homogeneous non-sintered ferrite members having respective surfaces in confronting relation to define a non-magnetic gap for coupling to a magnetic record medium, and a yoke structure of sintered ferrite material forming a loop magnetic circuit with said homogeneous non-sintered ferrite members and the gap therebetween.

8. A magnetic head comprising a pair of single crystal ferrite members having respective surfaces in confronting relation to provide a region for coupling of the members to a magnetic record medium, a yoke structure of sintered ferrite material included in a loop magnetic circuit with said single crystal ferrite members, means defining a path of travel of a record member successively across said single crystal ferrite members and in coupling relation to said region provided by said surfaces, and a magnetoelectric transducing element coupled to said loop magnetic circuit.

9. A magnetic head comprising a pair of homogeneous non-sintered ferrite members having respective surfaces in confronting relation to define a non-magnetic gap between said members and having side surfaces disposed at right angles to said confronting surfaces, and unitary side plate means of non-magnetic material in contact with said side surfaces of the respective ferrite members and spanning the gap therebetween.

10. A magnetic head comprising a pair of homogeneous non-sintered ferrite members having respective surfaces in confronting relation to define a non-magnetic gap between said members, a yoke structure forming a loop magnetic circuit with said ferrite members and the gap therebetween, and side plate means of non-magnetic material laterally contacting a side surface of each of the ferrite members and of the yoke structure and spanning the gap between the ferrite members.

11. A magnetic head comprising a pair of homogeneous non-sintered ferrite members having respective surfaces in confronting relation and having an evaporated film of non-magnetic material deposited upon at least one of said surfaces to rigidly determine the spacing therebetween and to define a non-magnetic gap for coupling to a magnetic record medium.

12. A magnetic head comprising a pair of single crystal ferrite members having respective surfaces in confronting relation and having an evaporated film deposited on at least one of said surfaces of approximately one-quarter micron thickness to rigidly determine the spacing between said members and to define a non-magnetic gap for coupling to a magnetic record medium.

References Cited in the file of this patent

UNITED STATES PATENTS

| | | |
|---|---|---|
| 2,261,412 | Reeve | Apr. 2, 1941 |
| 2,346,555 | Cobb | Apr. 11, 1944 |
| 2,585,932 | Hare | Feb. 19, 1952 |
| 2,592,652 | Buhrendorf | Apr. 15, 1952 |
| 2,692,978 | Galt | Oct. 26, 1954 |
| 2,706,752 | Dupy | Apr. 19, 1955 |
| 2,724,663 | Bond | Nov. 22, 1955 |
| 2,809,237 | Bergmann | Oct. 8, 1957 |
| 2,818,514 | Goerty | Dec. 31, 1957 |
| 2,862,066 | Thiele | Nov. 25, 1958 |
| 2,866,011 | Kornei | Dec. 23, 1958 |
| 2,919,312 | Rosenberger | Dec. 29, 1959 |
| 2,945,919 | Neumann | July 19, 1960 |

FOREIGN PATENTS

| | | |
|---|---|---|
| 669,458 | Great Britain | Apr. 2, 1952 |
| 713,371 | Great Britain | Aug. 11, 1954 |
| 893,385 | Germany | Oct. 15, 1953 |

OTHER REFERENCES

Proceedings of the IRE, October 1956, pp. 1343, 1344; available in the USPO Scientific Library.